United States Patent Office 3,015,030
Patented Dec. 26, 1961

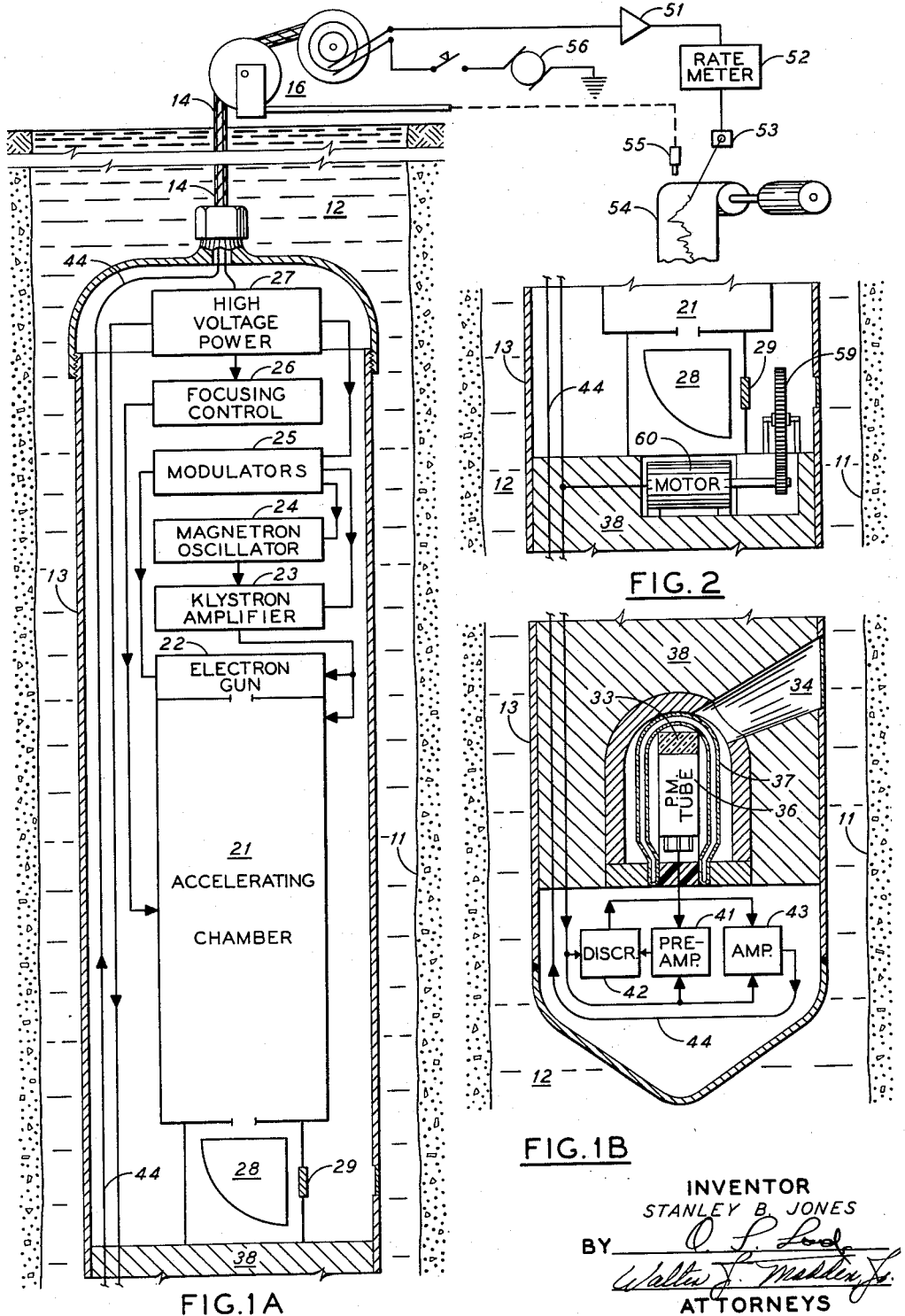

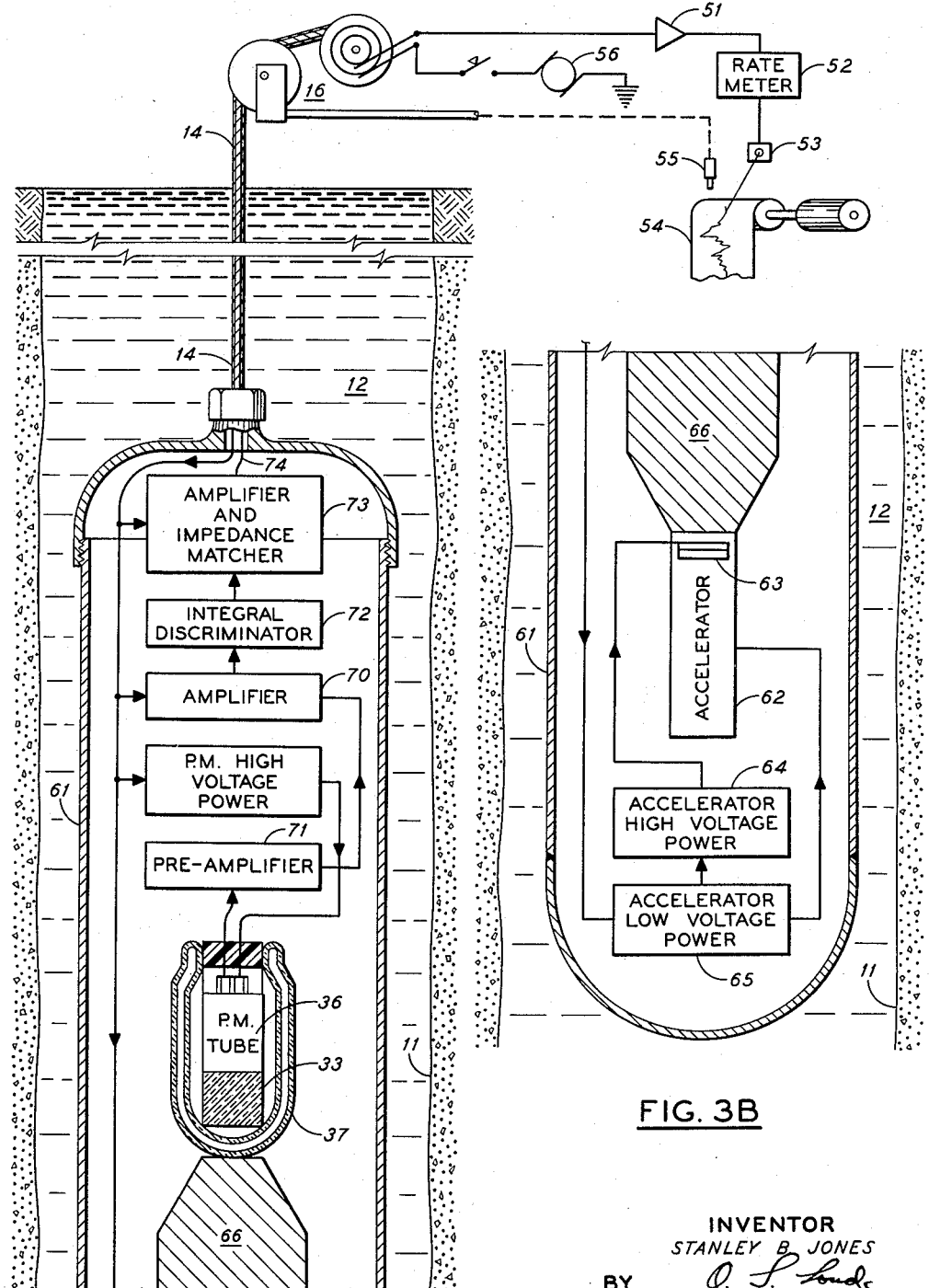

3,015,030
METHOD AND APPARATUS FOR LOGGING CARBON
Stanley B. Jones, Whittier, Calif., assignor to California Research Corporation, San Francisco, Calif., a corporation of Delaware
Filed July 12, 1957, Ser. No. 671,469
3 Claims. (Cl. 250—83.3)

This invention relates to a method of logging wells that are drilled to search for oil. More particularly, it relates to a method of logging that is able to detect unambiguously the presence of carbon in formations surrounding a borehole.

It has long been desired to have a logging method that would directly detect oil itself, or some constituent of the oil, such as carbon, but no such log has heretofore been available. A carbon log has possible uses other than the detection of oil. It is sometimes important to log the concentration of carbon in formations surrounding a well bore in order to evaluate limestone formations. The concentration of carbon can be used as an indication of the density and porosity of the carbonate formations. Drops in concentration can be used to delineate thin streaks of anhydrite in carbonate formations.

The present invention makes it possible directly to detect and measure concentrations of carbon around a borehole. This invention is based on a unique reaction between carbon nuclei and high energy electromagnetic radiation, such as X-rays, having a selected energy spectrum. In the following discussion the term "X-rays" has been used to include other forms of electromagnetic radiation, such as gamma rays or Bremsstrahlung radiation, which interact with carbon and other materials by identical processes and are separately designated only to indicate their source of origin. The above-mentioned unique reaction involves the back-scattering of the X-rays of selected energy with substantially unchanged energy, by carbon nuclei, so that the presence in the borehole, after bombardment thereof by X-rays having the selected energy spectrum, of X-rays having the selected energy, is indicative of this back-scattering by carbon nuclei and hence an indication of the presence of carbon in the logged formation.

In this invention, X-rays having a spectrum of energies covering the region of 14.8 to 15.4 mev. (million electron volts) are projected into the formations surrounding the borehole. These X-rays penetrate deeply in a non-carbonaceous rock formation because their absorption length is of the order of several feet for non-carbonaceous materials. On the other hand, the absorption length in carbon or graphite for X-rays having energies equal to the energy of the 15.09 mev. energy level of the carbon nucleus is only about one-half inch, because the carbon nucleus has an exceedingly large probability of elastically scattering X-rays of this energy. In fact, the cross-section of a carbon nucleus for this scattering process is about 30 barns, whereas the cross-section for other nuclei that display scattering of X-rays in this energy region is only of the order of 1 to 10 millibarns. This large scattering probability for carbon, however, is confined to X-rays having energies in the region of 15.09 mev., since the cross-section of carbon for X-rays of energies above and below 15.09 mev. is very small. Thus, in view of this substantial disparity between the probabilities of elastic scattering of X-rays of this energy level by the carbon nucleus and by other nuclei, the presence in the borehole of appreciable quantities of elastically scattered X-rays at this energy level provides a reliable indication of the presence in the bombarded formation of appreciable amounts of carbon. These elastically back-scattered X-rays have an energy band-width of only 20–30 kev., thus producing a sharp energy peak centered at about 15.09 mev.

The X-rays which are elastically scattered by the carbon nuclei have nearly their full original energy, even if they are scattered directly backward. Hence, they retain their extreme penetrating power in rock formations even if they are scattered backward toward the borehole where they can be detected. Thus, oil two or three feet into the rock behind the zone invaded by filtrate from the drilling fluid can be detected. Even if the drilling fluid invasion is unusually deep, signals can still be obtained from this invaded zone because in nearly all instances some residual oil saturation of a few percent at least is found in the invaded zone.

Radiations from scattering of the original X-ray beam by electrons will be primarily directed outwardly in the rock formation, and radiation that is scattered backward as a result of electron scattering will have an energy of 1 mev. or less. Similarly, any radiation which is back-scattered from nuclei other than that of carbon will have intensities 100 times or so less than that from carbon, and no nuclei other than carbon will appreciably back-scatter radiation with an energy of exactly 15.09 mev. Thus, through the use of suitable energy discriminators and/or radiation shields in the detection circuit, only radiation having energies in the desired spectrum will be converted into the resultant signal.

Any suitable source of X-rays of the desired energy level or spectrum may be utilized in the present invention. An example of such a suitable source is an electron accelerator capable of generating a stream of approximately 16 mev. electrons, which stream is directed at a suitable target to generate X-rays in the desired energy level. Alternatively, a proton accelerator may be utilized which accelerates a stream of protons at a lithium target to produce gamma rays of an energy level of 17.6 mev. by the reaction $Li^7(p)Be^8$. These 17.6 mev. gamma rays can then be degraded in energy either in the rock formation or by a heavy metal foil such that some gamma rays with the desired energy of 15.09 mev. are produced. Also, the $Li^7(p)Be^8$ reaction produces gamma rays in the energy range of 13.8 to 15.8 mev. region so that additional gamma rays with energy of 15.09 mev. are produced directly.

An additional refinement of the present invention contemplates a method of pulsing the beam of X-rays at a particular frequency, and detecting only those signals which display this particular frequency. The X-rays can be pulsed, for example, by utilizing a carbon shutter which is moved in and out of the X-ray beam at a suitable frequency, such as 100 cycles per second. Such a frequency can be readily transmitted through the logging cable and may be filtered out of the direct current power in the cable at the surface. The use of this pulsing system increases the signal-to-noise ratio and lends more certainty to the inference that the resultant signal indicates the presence of carbon in the rock formation.

It is therefore an object of this invention to provide improved methods and apparatus for detecting the presence of carbon in a subterranean formation penetrated by a well bore.

It is an additional object of the present invention to provide methods and apparatus for detecting the presence of carbon in a subterranean formation in which the reaction of carbon nuclei to electromagnetic radiation of a particular energy is utilized as an indication of the concentration of carbon.

It is a further object of this invention to provide methods and apparatus for detecting the presence of carbon in a subterranean formation penetrated by a well bore in which the formation is subjected to electromagnetic radiation of a particular energy which reacts in a unique manner with the nuclei of carbon present in the formation, and the radiation resulting from this unique reaction is detected as a measure of the carbon concentration in the formation.

It is an additional object of the present invention to provide methods and apparatus for detecting the presence of carbon in a subterranean formation penetrated by a well bore in which a stream of X-rays having an energy level of approximately 15.09 mev. is projected at the formation to produce elastic back-scattering of some of these X-rays by carbon nuclei in the formation, and the elastically back-scattered X-rays are detected as a measure of the carbon concentration in the formation.

Objects and advantages other than those set forth above will be apparent from the following description when read in connection with the accompanying drawings in which:

FIG. 1A illustrates the disposition in a representative borehole of the X-ray generating portion of a logging sonde utilizing an electron accelerator to generate the X-rays, together with the associated surface equipment;

FIG. 1B is a continuation of FIG. 1A and illustrates the detection portion of the sonde of FIG. 1A;

FIG. 2 illustrates a modification of the embodiment illustrated in FIGS. 1A and 1B, which provides for pulsing of the X-ray beam;

FIG. 3A illustrates the upper detection portion of a well logging sonde utilizing a proton accelerator for generating X-rays, together with the associated surface equipment; and FIG. 3B is a continuation of FIG. 3A illustrating the proton accelerator and lithium target.

Referring to FIGS. 1A and 1B by character of reference, numeral 11 designates a formation which is to be logged by the method of the present invention. Formation 11 is penetrated by a borehole 12 into which may be inserted a logging sonde generally designated as 13 which carries the X-ray generation and detection equipment. Sonde 13 is suspended in borehole 12 by a cable 14 which extends to the surface of the earth and passes over a sheave and winch 16. The winch is provided with a commutating arrangement for conveying the logging signal transmitted over cable 14 to suitable amplifying and recording equipment to be described more in detail below.

Sonde 13 comprises generally a particle acceleration and radiation generating section shown in FIG. 1A, and a radiation detection section shown in FIG. 1B. In the embodiment illustrated in FIGS. 1A and 1B, the method of generating the X-rays having the energy spectrum required for the present invention is assumed to be that of bombarding a suitable target with accelerated electrons having an energy of approximately 16 mev. Such electron acceleration may be produced in an accelerating chamber 21 to which electrons are supplied from an electron gun 22. A suitable source of high frequency power, such as a klystron amplifier 23, is provided to supply such power to electron gun 22 and accelerating chamber 21, as is well known in the electron accelerating are. Klystron amplifier 23 in turn is controlled by a magnetron oscillator 24. A modulating network, generally designated as 25, is provided to control magnetron oscillator 24, klystron amplifier 23 and electron gun 22. A foscusing control network 26 is connected to supply a focusing control signal to suitable means, such as a coil wound along the length of accelerating chamber 21, to control the axial focusing of the accelerated electrons in chamber 21. A suitable high voltage power supply network 27 may also be provided in sonde 13 to supply high voltage power to the different components of the acceleration and detection units.

The electrons accelerated in chamber 21 to an energy of approximately 16 mev. emerge from accelerating chamber 21 and are deflected through approximately a 90° angle by a magnet 28. Magnet 28 thus deflects the 16 mev. electrons toward a target 29 which emits X-rays when bombarded by electrons. The intensity of the electron beam is maintained sufficiently low so that individual X-rays are resolved by the scintillation detector to be described later. Target 29 may be of any suitable material, such as tungsten, as is well known in the art. The X-rays from target 29, having a spectrum of energy covering at least the region of 14.8 to 15.4 mev., thus emerge from sonde 13 and enter formation 11.

Selected radiation back-scattered from the X-ray bombardment of formation 11 is detected by an energy measuring arrangement (FIG. 1B) including a scintillation crystal 33 which is exposed to selected back-scattered radiation from formation 11 through an opening 34 in the side of sonde 13. A photomultiplier tube 36 is associated with crystal 33 and these two elements are mounted in a Dewar flask 37 for thermal insulation during the downhole run. The scintillation counter is shielded from X-rays coming directly from the accelerator and target by shielding material 38. The electrical output from photomultiplier 36 is supplied to a preamplifier 41 and thence to an energy discriminating device 42 which discriminates against energy below a predetermined level, so that only signals from individual X-rays representing radiation above this predetermined energy level are transmitted to an amplifier 43. The signal from amplifier 43 is transmitted to the earth's surface through a conductor 44 which runs inside logging cable 14. At the surface the signal is amplified by an amplifier 51 and supplied through a rate meter 52 to an oscillograph 53 which records on chart 54. The depth of sonde 13 in the borehole is indicated by a depth marker 55 which prints suitable depth indicia on a chart 54. Power is supplied to the surface recording equipment and the sonde by a source 56.

The operation of the embodiment illustrated in FIG. 1 is as follows: Sonde 13 is lowered into borehole 12 and when the formation to be logged is reached, power is supplied from source 56 to high voltage supply network 27 to energize the accelerating and detection components in sonde 13. Energization of the accelerating components produces a beam of 16 mev. electrons in accelerating chamber 21 which are deflected through 90° by magnet 28 and directed toward target 29 to produce emission therefrom of X-rays having an energy spectrum that covers at least the range between 14.8 and 15.4 mev. X-rays within this energy spectrum penetrate deeply within the rock formation 11 and some of these X-rays are elastically back-scattered by carbon nuclei, if present in the formation. As set forth above, owing to the exceedingly large probability of the carbon nucleus elastically scattering X-rays of 15.09 energy level, any X-rays which arrive at the scintillation counter in sonde 13 with an energy level of about 15.09 are the result of such elastic scattering of the generated X-rays.

The X-rays emerging from formation 11 after being elastically scattered by carbon nuclei will have an energy slightly less than that of the original X-ray radiation, since the carbon nucleus does absorb a small amount of energy in recoiling, but this energy loss is only of the order of 10,000 electron volts, or .01 mev., so that its effect is negligible on the method of the present invention. The elastically back-scattered radiation has an energy band-width of only 20 or 30 kev., so that identification of the detected back-scattered energy is facilitated. The amount of radiation of approximately 15.1 mev. measured in the detection circuit is a measure of the carbon content of the logged formation, since discriminator 42 discriminates against signals resulting from radiation having an energy appreciably below 15 mev. Additionally, if it is desired to increase the discriminating action of the detector unit, a suitable shielding or absorption material, such as steel or bismuth, may be provided between the scintillation counter and the logged formation to absorb X-rays having energies below say, 5 mev. The back-scattered X-ray intensity must be maintained sufficiently low so that the individual X-ray quanta are resolved by the detector.

The signal from discriminator 42 and amplifier 43, which signal is a measure of the carbon content of the logged formation, is transmitted through conductor 44 in logging cable 14 to the surface recording equipment where it is recorded on chart 54 in correlation with an indication of the logged depth provided by marker 55. The logging instrument may thus be run in the borehole past the formation or formations of interest, to provide on chart 54 an indication of the carbon content of the formations.

FIG. 2 illustrates a modification of the apparatus shown in FIG. 1, in which the X-ray beam from the accelerator is pulsed at a particular frequency. Such pulsing may be produced in any suitable manner, such as through the use of a carbon shutter 59 which is adapted to be alternately moved into and out of the beam of X-rays generated by the accelerator. In the embodiment illustrated in FIG. 2, shutter 59 is assumed to be in the form of a disc having alternate segments of carbon and a non-carbon material. Disc 59 is driven by a motor 60 at a suitable speed for providing the desired frequency of pulsing. For example, if a pulsing frequency of 100 cycles per second is desired, shutter 59 may be provided with five carbon segments and 5 non-carbon segments and motor 60 may operate to produce 20 revolutions per second of disc 59, to produce the desired 100 cycle per second pulse rate. This shutter must be in the incident X-ray beam and not the back-scattered beam, because the back-scattered X-rays will have too low an energy to be again strongly scattered by carbon.

The X-ray beam entering formation 11 is thus pulsed at the desired frequency to produce a corresponding pulse rate in the signals detected by the scintillation counter. The use of this pulsing frequency increases the facility with which the signal from the detection unit may be transmitted through conductor 44 to be detected by the surface recording equipment. It also has the advantage of making more certain that signals detected by the detection unit are the result of the desired back-scattering of X-rays from carbon nuclei in the formation, rather than from mal-functioning of the equipment, since signals resulting from the desired back-scattering should exhibit the same pulse frequency as that of the pulsed X-ray beam and signals which do not exhibit this pulse frequency can be disregarded or at least viewed with skepticism.

FIGS. 3A and 3B illustrate alternate apparatus for generating X-rays having the energy spectrum necessary to carry out the method of the present invention. In FIGS. 3A and 3B, reference numeral 61 designates a sonde adapted to be lowered into borehole 12 to log formation 11. In sonde 61, the gamma rays are produced by the bombardment of a lithium target with protons to produce gamma rays from the reaction $Li^7(p)Be^8$. This reaction produces gamma rays having a sharply defined energy at 17.6 mev. and also produces gamma rays having a more diffuse energy level centered at approximately 14.8 mev. and extending for 1 mev. on either side of this center. The gamma rays of both of the above energy levels are useful in the present invention. The gamma rays of 17.6 mev. energy emitted by the lithium target enter the formation, and some of them are Compton-scattered therein to produce a continuous energy spectrum which includes some gamma rays of substantially 15 mev. Some of these 15 mev. gamma rays which are produced by Compton scattering will then be elastically back-scattered by collisions with carbon nuclei, while retaining substantially their 15 mev. energy level, and their detection provides an indication of the carbon concentration in the logged formation. Similarly, some of the gamma rays emitted by the lithium target with an energy level centered at 14.8 mev. and extending to 15.8 mev. will be elastically back-scattered at about 15 mev. by carbon nuclei.

Protons of the required energy are produced in a proton accelerator 62 which has at one end thereof a lithium target 63 at which the protons are directed. Accelerator 62 may be of any suitable type, such as a Cockroft-Walton generator or a Van de Graaff generator. Power is supplied to accelerator 62 from a high voltage power supply 64 and a low voltage power supply 65. The above-described reaction for creating gamma rays can be produced by protons having a fairly wide energy level, but the reaction has a sharp resonance when the protons have an energy of 441 kev. and accordingly, protons of this energy are preferably generated in accelerator 62. The elastically back-scattered gamma rays in formation 11 are detected by suitable means, such as an ionization chamber, or, as shown, a scintillation counter comprising crystal 33 and photomultiplier tube 36. The detector is shielded from the accelerator 62 by shielding material 66.

The output signal from photomultiplier 36 is supplied through a preamplifier 71 to an amplifier 70 and thence to a discriminator 72 which discriminates against signals resulting from radiation having an energy appreciably less than 15 mev. The output signal from discriminator 72 is supplied through an amplifier and impedance matching network 73 to a conductor 74 for transmission to the surface recording equipment. Although discriminator 72 is shown disposed in the logging sonde, it will be understood that it could be located at the earth's surface, if desired.

The operation of the embodiment illustrated in FIG. 3 is as follows: With sonde 61 in position adjacent the formation to be logged, the components of the sonde are energized to produce in accelerator 62 a beam of protons, preferably having an energy of 441±6 kev., directed at lithium target 63. This bombardment of target 63 by the proton beam produces gamma rays having an energy of 17.6 mev. and gamma rays having an energy centered at 14.8 mev. The intensity of emission is not uniform with angle of emission, but the anisotropy is not strong enough to be an important factor. The gamma rays enter the formation 11 and, with respect to the 17.6 mev. gamma rays, the Compton scattering thereof changes the line spectrum to a continuous spectrum, which spectrum includes gamma rays having an energy of 15 mev. Similarly, the gamma rays emitted by target 63 having an energy centered at 14.8 mev. and extending for 1 mev. on either side of this center will enter the formation and be back-scattered by carbon nuclei.

Shield 66 prevents gamma rays from reaching the detector directly from the accelerator and lithium target. Gamma rays can only reach the detector after Compton scattering or after elastic scattering from carbon. The shape of shield 66, which may be made of lead, bismuth, uranium-238 or other heavy material, is such that the scattering angle of gamma rays reaching the detector must be at least 10°. If a gamma ray originally has an energy of 17.6 mev., its energy after scattering through 10° is 11.6 mev. Thus, the highest energy gamma ray reaching the detector through Compton scattering has an energy detected, and, in the absence of carbon, no gamma rays of 11.6 mev. The gamma rays elastically scattered from carbon have an energy of 15.09 mev. Hence, no gamma rays of energy between about 12 and about 15 mev. are above 12 mev., are detected. Integral discriminator 72 is such that it passes to the counting and recording mechanisms only pulses of amplitude corresponding to gamma rays of energy above about 14 mev., so that all of these pulses must represent actually gamma rays of 15.09 mev. which have been scattered from carbon.

Features disclosed but not claimed herein are claimed in a copending application of Paul E. Baker, Serial No. 666,538, filed June 19, 1957, assigned to the same assignee as this application.

I claim:

1. The method of detecting the presence of carbon in a subterranean formation penetrated by a well bore comprising the steps of generating in said well bore electromagnetic radiation having an energy of at least 15 mev., irradiating the adjacent earth formation with said radiation to produce elastic scattering of said 15 mev. radiation by collision with the nuclei of carbon in said formation, said elastically scattered radiation having energies of about 15 mev., positioning a radiation detector adjacent said formation and shielded from said generated radiation, detecting radiation from said formation, excluding from said detected radiation substantially all electromagnetic radiation having energies less than about 14 mev., and indicating the amount of said detected radiation having energies of not less than about 15 mev., as a measure of the presence of carbon in said formation.

2. The method of detecting the presence of carbon in a subterranean formation penetrated by a well bore comprising the steps of generating in said well bore a stream of particles having a predetermined energy level, directing said stream of particles at an X-ray-emitting target to produce X-rays having an energy of at least 15 mev., irradiating the adjacent earth formation with said X-rays, positioning a radiation detector adjacent said formation and shielded from said generated X-rays, excluding from said detector substantially all electromagnetic radiation having energies less than about 14 mev., detecting at least X-rays from said formation which have been elastically scattered by collision with the nuclei of carbon in said formation and which have energies of not less than about 15 mev., and indicating the amount of said detected X-rays, as a measure of the presence of carbon in said formation.

3. The method of detecting the presence of carbon in a formation penetrated by a well bore comprising the steps of generating in said well bore primary electromagnetic radiation having an energy spectra centered around 15 mev., irradiating the adjacent earth formation with said radiation to produce elastic scattering of said radiation by collision with the nuclei of material in said formation, positioning a radiation detector adjacent to said formation, shielding said detector from said primary electromagnetic radiation to prevent said primary radiation from reaching said detector unless scattered through an angle of at least 10°, detecting in said well bore radiation which has been scattered by elastic collisions with nuclei of said formation materials, and analyzing said detected radiation for a peak of radiation centered about 15.09 mev., as an indication of the presence of carbon nuclei within said formation.

References Cited in the file of this patent

UNITED STATES PATENTS

| | | |
|---|---|---|
| Re. 23,226 | Bender | May 9, 1950 |
| 2,275,748 | Fearon | Mar. 10, 1942 |
| 2,653,271 | Woodyard | Sept. 22, 1953 |
| 2,689,918 | Youmans | Sept. 21, 1954 |
| 2,712,081 | Fearon | June 28, 1955 |
| 2,785,315 | Goodman | Mar. 12, 1957 |
| 2,884,534 | Fearon et al. | Apr. 28, 1959 |
| 2,905,826 | Bonner et al. | Sept. 22, 1959 |
| 2,910,591 | Baker | Oct. 27, 1959 |
| 2,922,886 | Putman | Jan. 26, 1960 |
| 2,923,824 | Martin et al. | Feb. 2, 1960 |
| 2,943,200 | Rickard | June 28, 1960 |

FOREIGN PATENTS

| | | |
|---|---|---|
| 724,441 | Great Britain | Feb. 23, 1955 |

UNITED STATES PATENT OFFICE
CERTIFICATE OF CORRECTION

Patent No. 3,015,030                        December 26, 1961

Stanley B. Jones

It is hereby certified that error appears in the above numbered patent requiring correction and that the said Letters Patent should read as corrected below.

Column 3, line 59, for "are" read -- art --; line 63, for "foscusing" read -- focusing --; column 6, line 58, strike out "detected, and in the absence of carbon, no gamma rays" and insert the same after "are" in line 61, same column 6.

Signed and sealed this 5th day of June 1962.

(SEAL)
Attest:

ERNEST W. SWIDER
Attesting Officer

DAVID L. LADD
Commissioner of Patents